US007761084B2

(12) United States Patent (10) Patent No.: US 7,761,084 B2
Thistle et al. (45) Date of Patent: Jul. 20, 2010

(54) SYSTEMS AND METHODS FOR SESSION RECORDS CORRELATION

(75) Inventors: Mark Thistle, Ontario (CA); Mark Jones, Ontario (CA)

(73) Assignee: Bridgewater Systems Corp., Ottawa, Ontario (CA)

( * ) Notice: Subject to any disclaimer, the term of this patent is extended or adjusted under 35 U.S.C. 154(b) by 790 days.

(21) Appl. No.: 11/708,687

(22) Filed: Feb. 21, 2007

(65) Prior Publication Data

US 2008/0200145 A1 Aug. 21, 2008

(51) Int. Cl.
*H04M 11/00* (2006.01)
(52) U.S. Cl. ........................................ 455/408; 455/406
(58) Field of Classification Search .......... 455/406–408
See application file for complete search history.

(56) References Cited

U.S. PATENT DOCUMENTS

| 6,453,162 | B1 | 9/2002 | Gentry |
| 6,477,576 | B2 | 11/2002 | Angwin et al. |
| 6,603,969 | B1 | 8/2003 | Vuoristo et al. |
| 6,628,934 | B2 | 9/2003 | Rosenberg et al. |
| 6,708,033 | B1 | 3/2004 | Linkola et al. |
| 7,072,653 | B1 | 7/2006 | Sladek et al. |
| 7,236,780 | B2 | 6/2007 | Benco et al. |
| 2005/0003798 | A1* | 1/2005 | Jones et al. ............... 455/410 |
| 2005/0122922 | A1* | 6/2005 | Wu et al. .................. 370/310 |
| 2005/0208940 | A1 | 9/2005 | Takase et al. |
| 2005/0283401 | A1 | 12/2005 | Swix et al. |
| 2009/0030943 | A1* | 1/2009 | Kall ...................... 707/104.1 |

FOREIGN PATENT DOCUMENTS

| WO | WO 98/23099 A2 | 5/1998 |
| WO | WO 98/23099 A3 | 5/1998 |
| WO | WO 00/72572 A1 | 11/2000 |
| WO | WO 2005/045620 A2 | 5/2005 |

OTHER PUBLICATIONS

3rd Generation Partnership Project 2 "3GPP2", "cdma2000 Wireless IP Network Standard; Accounting Services and 3GPP2 Radius VSAs", Oct. 2006, pp. i-45, Version 3.0: 3GPP2 X.S0011-005-C, (http://www.3gpp2.org/public_html/specs/X.S0011-005-C_v3.0_061030.pdf).
Pandey, Vijoy et al., "Exploiting User Profiles to Support Differentiated Services in Next-Generation Wireless Networks", Nortel Networks and Department of Computer Science of The University of California at Davis, Jul. 15, 2002 (Revised Dec. 30, 2003), pp. 1-23, California.
International Search Report for PCT/IB2007/004296, dated Jul. 11, 2008, 10 pp.

* cited by examiner

*Primary Examiner*—Lester Kincaid
*Assistant Examiner*—Steven Lim
(74) *Attorney, Agent, or Firm*—Sterne Kessler Goldstein & Fox, P.L.L.C.

(57) ABSTRACT

A billing mediation system for use within a communications network that correlates session records pertaining to usage of network resources is disclosed. The billing mediation system includes a record receiver, a record correlator, a look ahead cache, a set of buffers, and a session records database. The set of buffers includes a single segment insert buffer, a multi segment insert buffer, a multi segment update buffer and a billing finalization update buffer. A method for correlating session records is also provided. The method includes receiving a session record, placing the session record into a segment buffer based on the type of record, and updating a look ahead cache including providing a timestamp for the last update for a session. The transfer of correlated session records to a billing system is based on whether records for a session have been received based on session tracking within the look ahead cache.

18 Claims, 6 Drawing Sheets

SYSTEMS AND METHODS FOR SESSION RECORDS CORRELATION

BACKGROUND OF THE INVENTION

1. Field of the Invention

The present invention relates to communications, and more particularly, to billing mediation systems and methods that correlate session records.

2. Background of Invention

Billing for wireless data communications services presents a significant challenge as operators implement next generation wireless networks. Traditional billing models based on call duration and/or distance are difficult to apply to data services and do not enable measurement of the real value of the data services. Rather new billing paradigms have evolved in which network operators capture session records associated with data services and bill end users based on the data service usage activities captured in those session records.

Billing mediation systems are critical to realizing this new billing paradigm. Specifically, billing mediation systems interface a wireless data network using Internet Protocol ("IP"), such as CDMA2000, to a billing system to enable network operators to appropriately bill end users for the value of data services. A billing mediation system correlates and aggregates all usage relating to a particular session. A billing mediation system must be able to collect network usage data, produce the proper information for billing systems, and integrate with the operator's customer care systems.

The need for billing mediation is driven by the inherently nomadic nature of wireless data services and is complicated by the differing network capabilities of operators. For example, as part of a single session a user may watch live coverage of the Super Bowl on his next generation wireless phone. The user may receive twenty minutes of coverage, then travel to a different location. In route to the new location, coverage becomes spotty and the user only receives still photographs and an audio feed of the game from a radio station. Furthermore, along the way, coverage degrades further to the point where only text message updates are provided. Finally, upon reaching the new location, service improves and full video coverage is available again. Billing mediation systems must correlate session records for data service activity handled by different network elements, as given in the above example. After processing the session records, the billing mediation system presents the correlated session records to a billing system in a required format.

Many challenges exist with billing mediation systems. A challenge with billing mediation is that there are many points within a network from which to collect basic network transaction data. The data exists in many network devices and application servers such as routers, IP switches and gateways. Information can be incomplete and must be augmented from other sources to be correlated in real-time, due to the dynamic nature of data. Moreover, transaction data may arrive at the mediation system out of order.

Given the vast number of transactions and complexity of the potential service scenarios, billing mediation system efficiency is paramount. The efficiency of the correlation is impacted by record ordering issues (due to failure paths through the distributed collection system) and the lack of a sequence identifier in the records to allow the order to be corrected prior to correlation. Current billing mediation solutions rely on database intensive operations and fragile delay algorithms in order to correlate records that arrive out-of-order at the billing mediation system.

What are needed are billing mediation methods and systems that efficiently correlate session records.

SUMMARY OF THE INVENTION

The present invention provides a billing mediation system for use within a communications network that correlates session records pertaining to usage of network resources. The billing mediation system includes a record receiver, a record correlator, a look ahead cache, a set of buffers, and a session records database. The set of buffers includes a single segment insert buffer, a multi segment insert buffer, a multi segment update buffer and a billing finalization update buffer.

A method for correlating session records pertaining to usage of network resources within a communications network is also provided. The method includes receiving a session record, placing the session record into a segment buffer based on the type of record, and updating a look ahead cache including providing a timestamp for the last update for a session. The method also includes periodically updating a billing finalization update buffer to indicate which session records are ready for billing based on the contents of the look ahead cache, periodically transferring the segment buffer contents into a session records database, and periodically setting a billing ready flag for records based on the contents of the billing finalization update buffer that indicates session records associated with a session are ready for billing system transfer within the session records database.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In particular, the present invention is described in the context of session records that have the following characteristics. First, session records have a unique identifier that associates a session record with a particular session. Second, each session record has an indication whether the record is the first and/or last record in a session. Finally, the session records do not contain a sequence number that identifies the order in which they were generated or an indication of the total number of session records in a session. Session records having these characteristics are defined in *TIA 835.5-C, cdma2000 Wireless IP Network Standard: Accounting Services and 3GPP2 Radius VSAs* and are commonly associated with services using RADIUS servers.

The following table summarizes the types of records and fields used to identify them for session records having the above characteristics.

| Record Type | Field Value Pairs |
| --- | --- |
| One of One (OoO) | SID = x; First = True; Last = True |
| First of Many (FoM) | SID = x; First = True; Last = False |
| Last of Many (LoM) | SID = x; First = False; Last = True |
| nth of Many (noM) | SID = x; First = False; Last = False |

SID is a value assigned to each record of a n-tuple that belong to the same session. When First=True, this indicates that the session record is the first record in the session. When Last=True, this indicates that the session record is the last record in the session.

Figure 1:
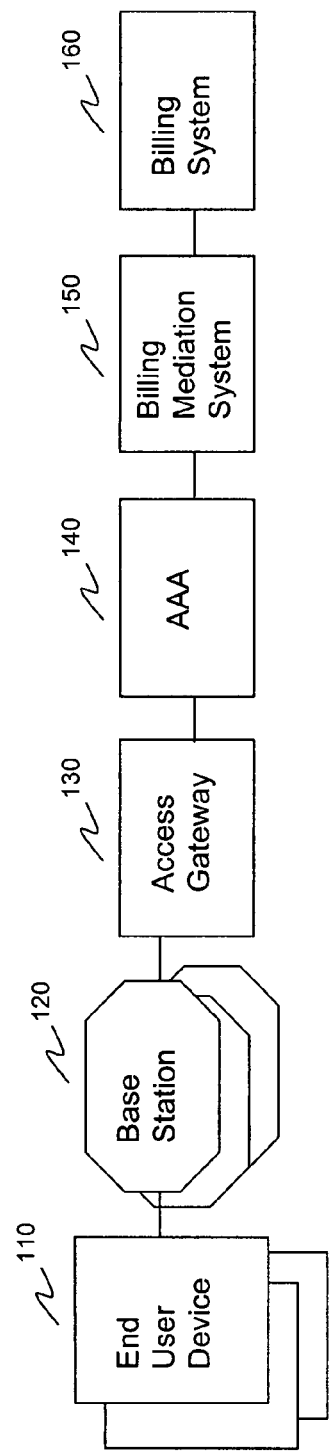
FIG. 1 provides a network diagram employing a billing mediation system, according to an embodiment of the present invention.

FIG. 1 provides a diagram of network 100 employing billing mediation system 150, according to an embodiment of the present invention. Network 100 includes end user device 110, base station 120, access gateway 130, Authentication, Authorization, Accounting (AAA) server 140, billing mediation system 150 and billing system 160.

End user device 110 is coupled to base station 120. End user device 120 can include, but is not limited to, a personal computer, a laptop computer, a cellular phone, a smart phone, an MP3 player, and a personal data assistant ("PDA"). In general end user device 110 includes electronic devices that enable an end user to access and use an electronic service over a communications network. Network 100 supports multiple end user devices.

Base station 120 includes a radio tower for wirelessly coupling end user device 120 to access gateway 130. Network 100 can support multiple base stations. Access gateway 130 is a public data network using IP protocol. In an embodiment, access gateway 130 includes a packet data service network ("PDSN"). Access gateway 130 can include multiple networks supported by different network operators. Access gateway 130 provides the backbone network for distributing data services to end user devices, such as end user device 120. AAA server 140 provides authorization, access and authentication of end user devices and users. Network 100 can support multiple AAA servers 140.

Billing mediation system 150 provides billing mediation services that support billing system 160. Billing mediation system 150 correlates and aggregates usage relating to end users. Billing mediation system 150 collects network usage data in the form of session records, produces the proper information for billing system 160 and integrates with other customer care systems that are not shown. Billing system 160 generates billing records for tracking customer usage and for generating billing statements.

Figure 2:
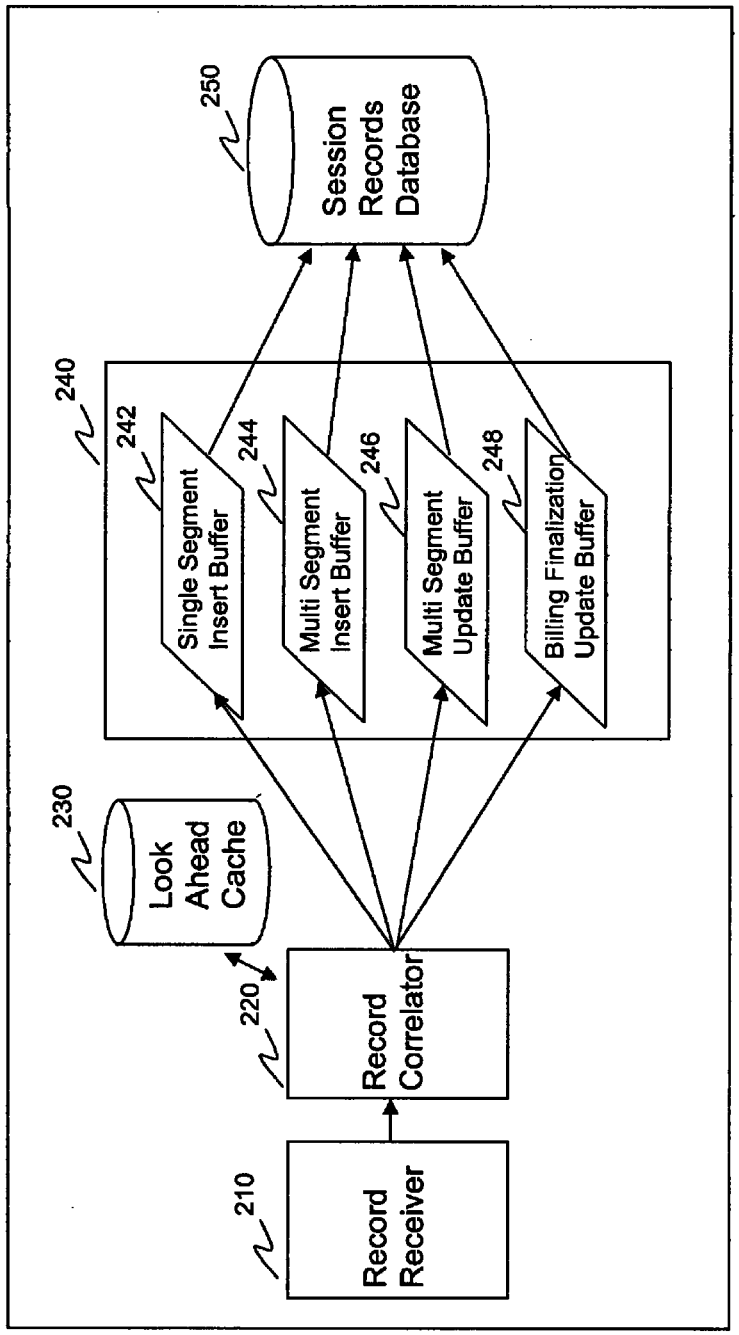
FIG. 2 provides a diagram of a billing mediation system, according to an embodiment of the invention.

FIG. 2 provides a block diagram of billing mediation system 150, according to an embodiment of the invention. Billing mediation system 150 is for use within a communications network, such as a wireless network using the CDMA2000 protocol to support data services, for example. The communications network can be wireless, wireline of a combination of wireless and wireline. Billing mediation system 150 correlates session records pertaining to usage of network resources by an end user device, such as end user device 110. Billing mediation system 150 includes record receiver 210, record correlator 220, look ahead cache 230, a set of buffers 240 and session records database 250. Set of buffers 240 includes single segment insert buffer 242, multi segment buffer 244, multi segment update buffer 246 and billing finalization update buffer 248.

Record receiver 210 receives session records from the record producer and provides the session records to record correlator 220. As shown in FIG. 1, records received by record receiver 210 will typically be routed through an access gateway and a AAA server.

Record correlator 220 receives and correlates session records. Record correlator 220 receives session records from record receiver 210. Record correlator 220 distributes incoming session records into set of buffers 240 and also provides updates to look ahead cache 230.

Look ahead cache 230 caches unique session identifiers for session records and a timestamp for each session identifier that indicates when the last record for that session was received.

Single segment insert buffer 242 stores session records for sessions having only one session record. Multi-segment insert buffer 244 stores the first received session record for sessions having more than one session record. Multi-segment update buffer 246 stores session records other than the first received session record for sessions having more than one session record. In an embodiment, the segment buffers can contain up to 500 records. Billing finalization update buffer 248 stores a unique session identifier for each session having at least one session record stored in either the multi-segment insert buffer or the multi-segment update buffer. Within billing finalization update buffer 248, a flag is set for a session identifier that indicates the session records for that session are finalized.

Record correlator 220 handles three scenarios related to how to process an incoming session record. First, when a session includes a single session record, record correlator 220 places the session record in single segment insert buffer 242 and no entry is made in look ahead cache 230.

Second, when a session includes more than one session record and the session record is the first session record in a session, record correlator 220 places the session record into the multi-segment insert buffer 244. Additionally, record correlator 220 places a unique session identifier for that session in look ahead cache 230 with a timestamp for the time when the session identifier is placed in the look ahead cache 230.

Third, when a session includes more than one session record, the session record is not the first session record in a session, and a unique session identifier for the session is included in the look ahead cache, record correlator 220 places the session record into multi-segment update buffer 246. Additionally, record correlator 220 updates the timestamp for the session in look ahead cache 230.

Record correlator 220 also monitors look ahead cache 230 to make an assessment whether the session records for any sessions are complete. When the time elapsed from the timestamp for a session identifier is greater than a session record delay threshold, record correlator 220 places the session identifier in billing finalization update buffer 248 and removes the session identifier from look ahead cache 230. In an embodiment, session record delay threshold is five minutes.

Session records database 250 stores session records that are received from single segment insert buffer 242, multi segment insert buffer 244, and multi segment update buffer 246. The contents of these buffers are transferred either upon the expiry of a buffer timer or when one of the buffers becomes full. Once the records are stored in session records database 250, when a determination is made that session records for a session are ready for transferring to a billing system, a flag is set for the session records. The determination is made by examining the contents of billing finalization update buffer 248. When a session has an indication in billing finalization update buffer 248 that the session records for the session is complete, a flag will be set for the session record in session records database 250 that indicates the session records for that session are ready to be transferred to a billing system.

Figure 3:
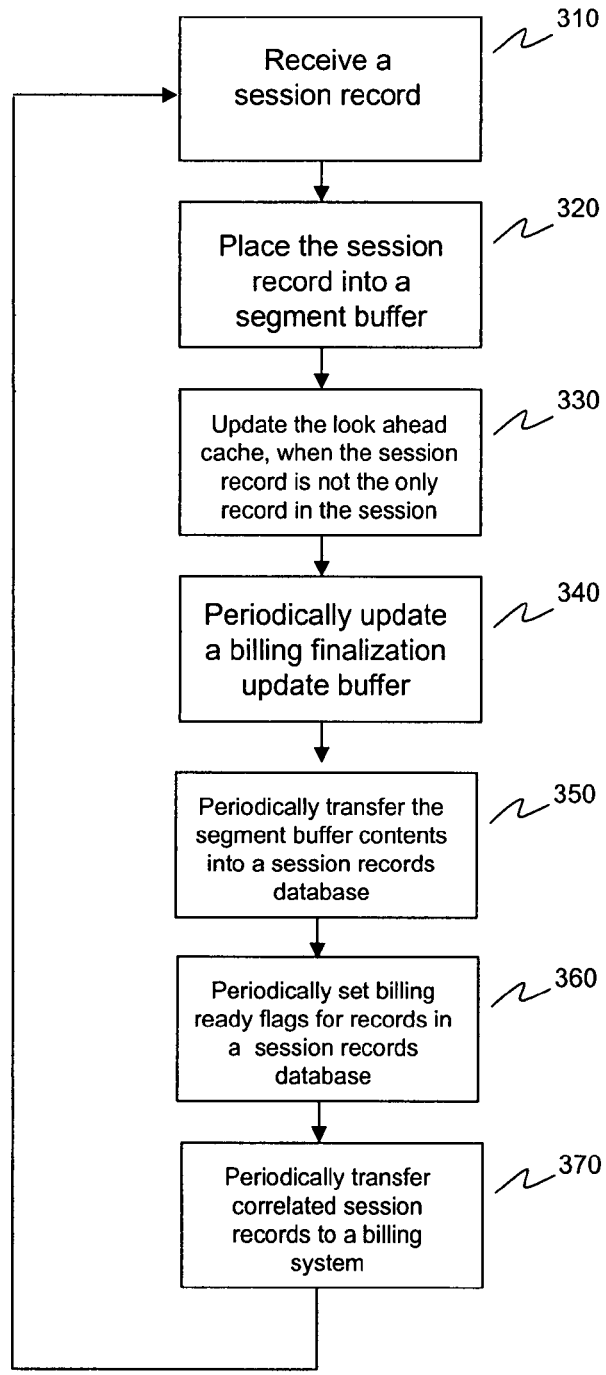
FIG. 3 provides a flowchart of a method for correlating session records pertaining to usage of network resources within a communications network, according to an embodiment of the invention.

FIG. 3 provides a flowchart of method 300 for correlating session records pertaining to usage of network resources within a communications network, according to an embodiment of the invention. Method 300 is described with respect to billing mediation system 150 for ease of illustration. This is not intended to limit the scope of the invention to a specific implementation. Note also that while steps 340 through 370 are shown following steps 310 to 340, they can occur at anytime and in any order. The occurrence of steps 330 through 370 will be dictated by either timers or other events that are independent of an individual session record being received.

Method 300 begins in step 310. In step 310 a session record is received. For example, billing mediation system 150 receives a session record from AAA server 140 that was generated as a result of end user device 110 accessing a network service.

In step 320 the session record is placed into a segment buffer. For example, the session record is placed into single segment insert buffer 242, multi segment insert buffer 244 or multi segment update buffer 246.

In step 330 a look ahead cache is updated, provided that the session record is not the only record in a session. If the session record is the only record in the session there is no need to update the look ahead cache, as the record does not need to be correlated. A specific implementation for placing the session record into a segment buffer and updating the look ahead cache is described with respect to FIG. 4, according to an embodiment of the invention.

Figure 4:
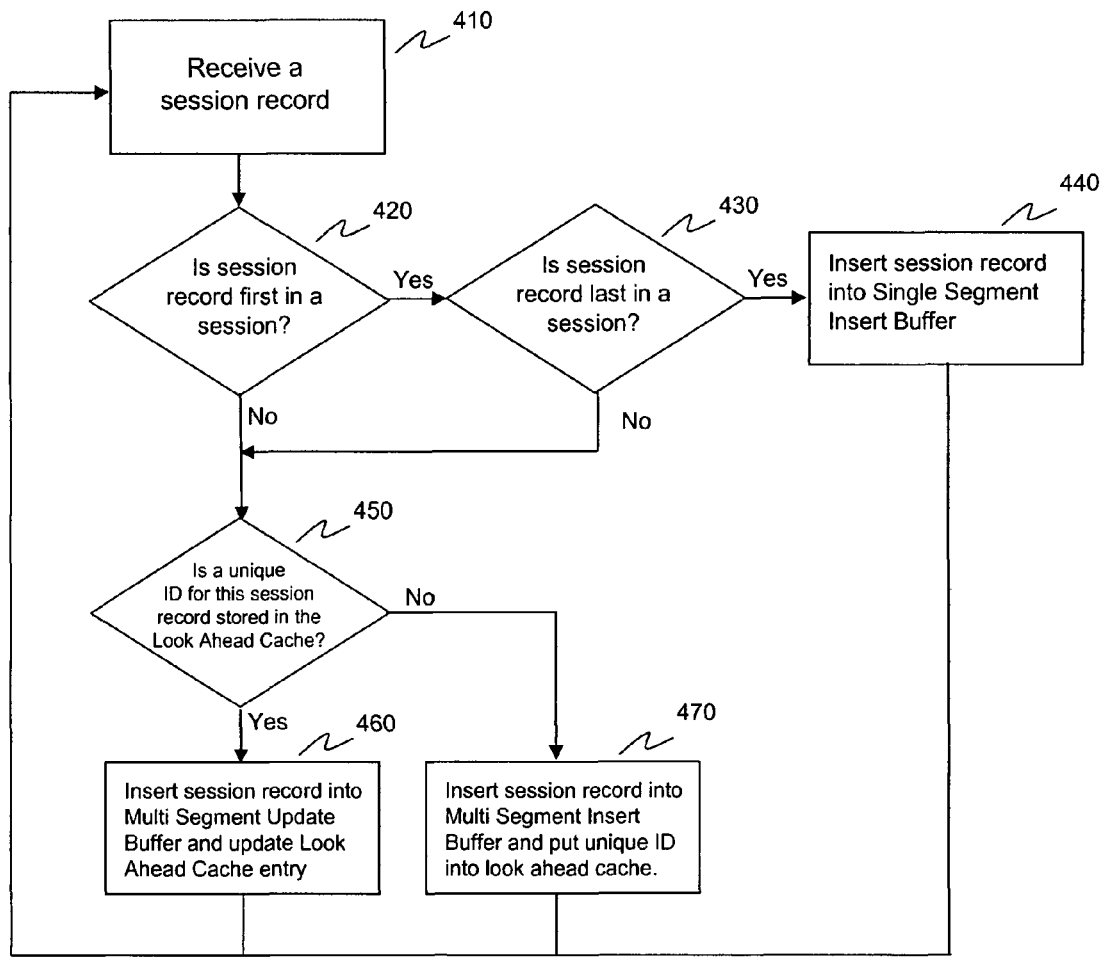
FIG. 4 provides a flowchart of method for placing session records into segment buffers and updating a look ahead cache, according to an embodiment of the invention.

FIG. 4 provides a flowchart of method 400 for placing session records into segment buffers and updating a look ahead cache, according to an embodiment of the invention. FIG. 4 begins in step 410, which is the same as step 310. In step 410 a session record is received.

In step 420 a determination is made whether the received session record is the first record in a session. If the received session record is the first record received in a session, then method 400 proceeds to step 430. In step 430 a determination is made whether the received session record is the last record for the session. If the received session record is the last record, this indicates that the session only includes a single record, and method 400 proceeds to step 440. In step 440 the session record is inserted into single segment insert buffer 242 and no updates are made to look ahead cache 230. Method 400 proceeds to step 480.

Referring back to step 420, if a determination was made that the record was not the first record in a session, then method 400 proceeds to step 450. Likewise, referring back to step 430, if a determination was made that the record was not the last record in a session, then method 400 proceeds to step 450.

In step 450 a determination is made whether a unique identifier for the session record is stored in look ahead cache 230. If a unique identifier is stored in look ahead cache 230, this indicates that the current received record is not the first record received for the session. Method 400 proceeds to step 460. In step 460 the session record is placed into multi-segment update buffer 246 and a new timestamp is placed into look ahead cache 230 for the session. Method 400 then proceeds back to step 410 to receive another record.

Referring back to step 450, if a unique identifier is not stored in look ahead cache 230, this indicates that the current received record is the first record received for the session. Method 400 proceeds to step 470. In step 470 the session record is placed into multi segment insert buffer 244 and a unique ID is placed into look ahead cache 230 along with a timestamp for the session. Method 400 then proceeds back to step 410 to receive another session record.

Referring back to method 300 in FIG. 3, in step 340 billing finalization update buffer 248 is periodically updated to indicate which session records are ready for billing based on the contents of look ahead cache 230. A specific implementation for updating billing finalization update buffer 248 is depicted in FIG. 5, according to an embodiment of the invention.

Figure 5:
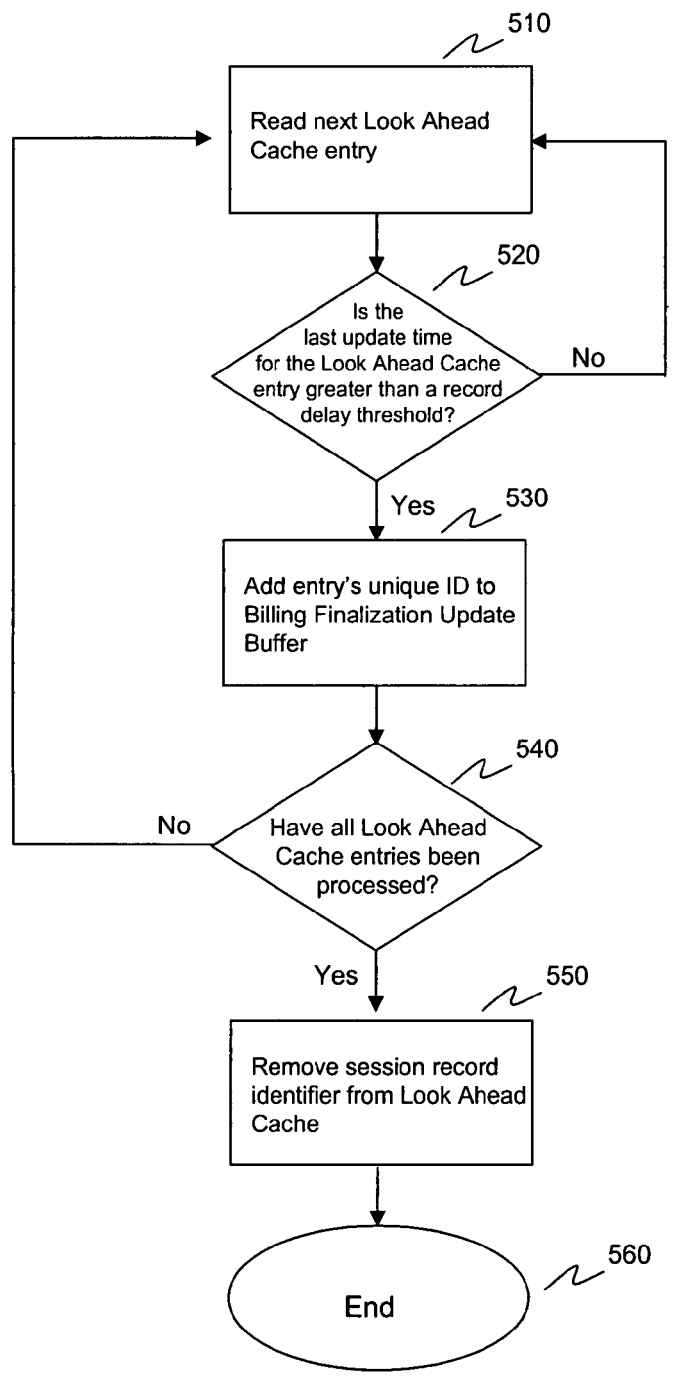
FIG. 5 provides a flowchart of method for updating a billing finalization update buffer, according to an embodiment of the invention.

FIG. 5 provides a flowchart of method 500 for updating billing finalization update buffer 410, according to an embodiment of the invention. Method 500 begins in step 510. The process of updating finalization update buffer 410 is initiated by the expiry of a timer. The timer is set based on the expected rate of receipt of session records. In step 510, provided that look ahead cache 230 is not empty, an entry in look ahead cache 230 is read. For example, record correlator 220 reads an entry from look ahead cache 230.

In step 520 a determination is made whether the elapsed time since the last timestamp for the entry in look ahead cache 230 exceeds a record delay threshold. The record delay threshold is established based on network characteristics with respect to the expected time for all records associated with a session to be received. While some outlier situations may occur, the threshold should be set sufficiently high to ensure that a large percentage of the sessions will have all session records received within the record delay threshold. In an embodiment the record delay threshold is five minutes. If the record delay threshold has not been exceeded, method 500 loops back to step 510. If the record delay threshold has been exceeded, this indicates that all records for the session have been received. Method 500 proceeds to step 530. In step 530 the unique session identifier for the entry is added to billing finalization buffer 248.

In step 540 the entry is removed from look ahead cache 230. In step 550 a determination is made whether all entries in look ahead cache 230 have been considered. If all entries have not been considered, method 500 loops back to step 510 to continue processing entries. If all entries have been considered, method 500 proceeds to step 560 and method 500 ends.

Referring back to method 300 in FIG. 3, in step 350 the contents of the segment buffers are periodically transferred into a session records database. The contents of segment buffers will be transferred either when a timer expires or when one of the buffers is full. Upon receipt of the session records, session records database 250 will know that session records from single segment insert buffer 242 are complete, and ready to be transferred to a billing system. Session records database 250 will not know that status of session records contained in multi segment insert buffer 244 or multi segment update buffer 246, relative to whether the session records are complete. The completeness of these records is determined bases on the status of the sessions as stored in billing finalization update buffer. The session records database 250 does know, however, that multi segment insert buffer will contain the first record received in a session and that multi segment update buffer includes session records other than the first record received. Using this knowledge, session records database can efficiently correlate the received records, without the need for inefficient error routines or checking that require retransmission of a batch of records when session records are received out of sequence.

In step 360 a billing ready flag is periodically set for records within the session records database. The billing ready flag is set when billing finalization update buffer 248 indicates that the records for a session are correlated and ready to be transferred to a billing system. A timer is used to trigger when session records database 250 will review billing finalization buffer 238.

In step 370 session records associated with sessions that are ready for billing are periodically transferred from session records database 250 to a billing system.

Method 300 then returns to step 310 to receive another session record. Method 300 will continue to loop through the process until the billing mediation system is disabled.

Computer System Implementation

Figure 6:
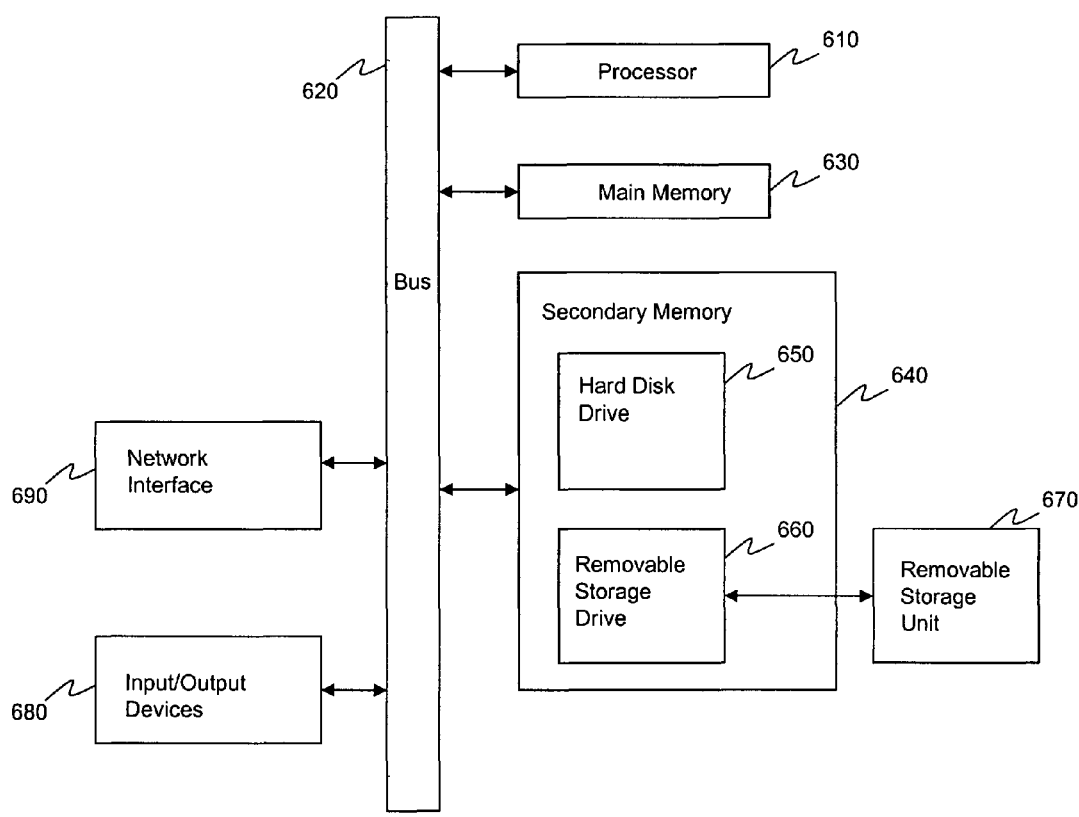
FIG. 6 is a diagram of a computer system on which the methods and systems herein described can be implemented, according to an embodiment of the invention.

In an embodiment of the present invention, the methods and systems of the present invention described herein are implemented using well known computers, such as a computer 600 shown in FIG. 6. The computer 600 can be any commercially available and well known computer or server capable of performing the functions described herein, such as computers available from International Business Machines, Apple, Sun, HP, Dell, Cray, etc.

Computer 600 includes one or more processors (also called central processing units, or CPUs), such as processor 610. Processor 600 is connected to communication bus 620. Computer 600 also includes a main or primary memory 630, preferably random access memory (RAM). Primary memory 630 has stored therein control logic (computer software), and data.

Computer 600 may also include one or more secondary storage devices 640. Secondary storage devices 640 include, for example, hard disk drive 650 and/or removable storage device or drive 660. Removable storage drive 660 represents a floppy disk drive, a magnetic tape drive, a compact disk drive, an optical storage device, tape backup, ZIP drive, JAZZ drive, etc.

Removable storage drive 660 interacts with removable storage unit 670. As will be appreciated, removable storage unit 660 includes a computer usable or readable storage medium having stored therein computer software (control logic) and/or data. Removable storage drive 660 reads from and/or writes to the removable storage unit 670 in a well known manner.

Removable storage unit 670, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 600, or multiple computer 600s to perform any combination of the functions described herein Computer programs (also called computer control logic) are stored in main memory 630 and/or the secondary storage devices 640. Such computer programs, when executed, direct computer 600 to perform the functions of the present invention as discussed herein. In particular, the computer programs, when executed, enable processor 610 to perform the functions of the present invention. Accordingly, such computer programs represent controllers of the computer 600.

Computer 600 also includes input/output/display devices 680, such as monitors, keyboards, pointing devices, etc.

Computer 600 further includes a communication or network interface 690. Network interface 690 enables computer 600 to communicate with remote devices. For example, network interface 690 allows computer 600 to communicate over communication networks, such as LANs, WANs, the Internet, etc. Network interface 690 may interface with remote sites or networks via wired or wireless connections. Computer 600 receives data and/or computer programs via network interface 690. The electrical/magnetic signals having contained therein data and/or computer programs received or transmitted by the computer 600 via interface 690 also represent computer program product(s).

The invention can work with software, hardware, and operating system implementations other than those described herein. Any software, hardware, and operating system implementations suitable for performing the functions described herein can be used.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A billing mediation system for use within a communications network that correlates session records pertaining to usage of network resources, wherein a record producer generates one or more session records during a session by a user, comprising:

a record correlator that receives and correlates session records, wherein each received session record has a unique identifier and an indication whether the received session record was the first or last record in a session;

a look ahead cache coupled to the record correlator that caches unique session identifiers for session records and a timestamp for each session identifier that indicates when the most recent record for that session was received;

a set of buffers coupled to the record correlator that store session records, wherein the buffers comprise:
  a single segment insert buffer that stores session records for sessions having only one session record;
  a multi-segment insert buffer that stores the first received session record for sessions having more than one session record;
  a multi-segment update buffer that stores session records other than the first received session record for sessions having more than one session record; and
  a billing finalization update buffer that stores a unique session identifier for each session having at least one session record stored in either the multi-segment insert buffer or the multi-segment update buffer, wherein a flag is set for a session identifier that indicates the session records for that session are finalized; and a session records database that stores correlated session records that are received from the set of buffers.

2. The billing mediation system of claim 1, further comprising a session record receiver that receives session records from the record producer and provides the session records to the record correlator.

3. The billing mediation system of claim 1, wherein when a session includes a single session record, the session record is placed in the single segment insert buffer and no entry is made in the look ahead cache.

4. The billing mediation system of claim 1, wherein when a session includes more than one session record and the session record is the first received session record in a session, the session record is placed into the multi-segment insert buffer and a unique session identifier for that session is placed in the look ahead cache with a timestamp for the time when the session identifier is placed in the look ahead cache.

5. The billing mediation system of claim 1, wherein when the session includes more than one session record, the session record is not the first received session record in a session, and a unique session identifier for the session is included in the look ahead cache, the session record is placed into the multi-segment update buffer and the timestamp is updated in the look ahead cache for the session identifier corresponding to the session record.

6. The billing mediation system of claim 1, wherein when the time elapsed from the timestamp for a session identifier is greater than a session record delay threshold, the session identifier is placed in the billing finalization update buffer and the session identifier is removed from the look ahead cache.

7. The billing mediation system of claim 1, further comprising a timer that determines when the session records contained in the set of buffers should be transferred to the session records database.

8. The billing mediation system of claim 1, wherein a flag is set within the session records database for a session when the session records are ready to be transferred to a billing system.

9. The billing mediation system of claim 1, wherein the communications network is a wireless communication network.

10. The billing mediation system of claim 8, wherein the communications network uses a CDMA2000 protocol.

11. The billing mediation system of claim 1, wherein the session records comply with the TIA-835 specification.

12. The billing mediation system of claim 1, wherein the session records are received from a radius server.

13. A method for correlating session records pertaining to usage of network resources within a communications network, wherein a record producer generates one or more session records during a session by a user, comprising:
  (a) receiving a session record;
  (b) placing the session record into a segment buffer, wherein placing the session record into a segment buffer includes:
    (i) placing the session record into a single segment buffer when the session record is from a session having only one session record;
    (ii) placing the session record into a multi-segment insert buffer when the session record is the first received session record for sessions having more than one session record; and
    (iii) placing the session record into a multi-segment update buffer when the session record is other than the first received session record for sessions having more than one session record;
  (c) updating a look ahead cache including providing a timestamp for the last update for a session, when the session record is not the only session record in a session;
  (d) periodically updating a billing finalization update buffer to indicate which session records are ready for billing based on the contents of the look ahead cache;
  (e) periodically transferring the segment buffer contents into a session records database; and
  (f) periodically setting a billing ready flag based on the contents of the billing finalization update buffer that indicates session records associated with a session are ready for billing system transfer within the session records database.

14. The method of claim 13, further comprising periodically transferring session records associated with sessions that are ready for billing from the billing session database to a billing system.

15. The method of claim 13, wherein updating the look ahead cache includes adding a unique identifier for a session when the session record is the first record received in the session.

16. The method of claim 13, wherein updating the look ahead cache includes providing a new timestamp when a unique identifier exists in the look ahead cache for the session of the received session record.

17. The method of claim 13, wherein updating a billing finalization update buffer to indicate which session records are ready for billing based on the contents of the look ahead cache includes indicating that session records within a session are ready for billing when the time elapsed from the timestamp is greater than a record delay threshold.

18. The method of claim 13, wherein the communications network is a wireless network using the CDMA2000 protocol.

* * * * *